May 11, 1937. J. ZUBATY 2,079,671
AUTOMOBILE CHASSIS SUSPENSION CONSTRUCTION
Filed Nov. 5, 1934 2 Sheets-Sheet 2

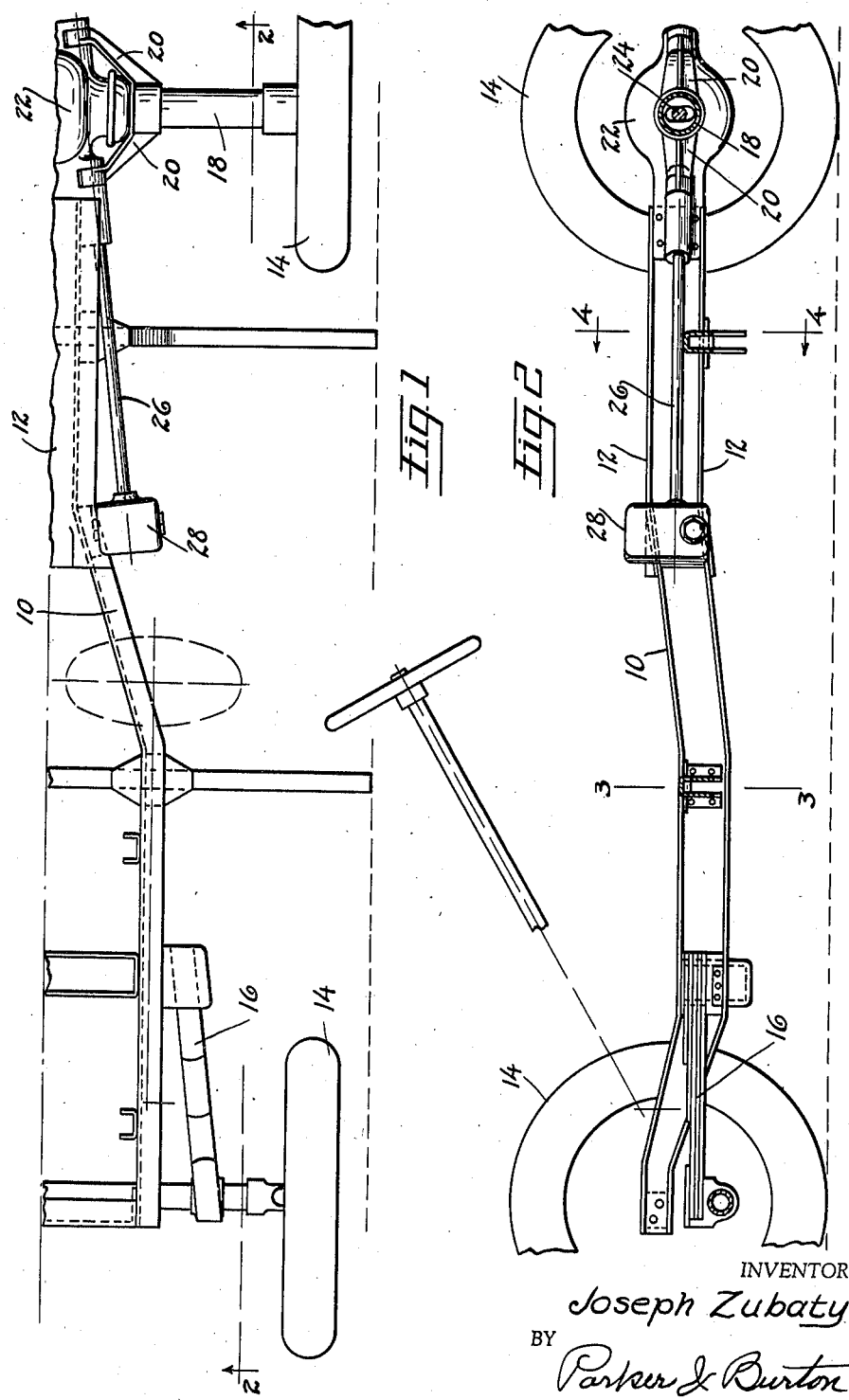

INVENTOR.
Joseph Zubaty
BY
Parker & Burton
ATTORNEYS.

Patented May 11, 1937

2,079,671

UNITED STATES PATENT OFFICE 2,079,671

AUTOMOBILE CHASSIS SUSPENSION CONSTRUCTION

Joseph Zubaty, Plzen, Czechoslovakia

Application November 5, 1934, Serial No. 751,473

11 Claims. (Cl. 180—73)

My invention relates to improvements in automotive vehicle chassis suspension construction and particularly to an improved mounting and suspension for independently swingable half axle assemblies.

More specifically, an object is to provide an improved simple and efficient mounting and suspension for independently swingable half axle assemblies so constructed and arranged as to cooperate in a highly satisfactory manner with either the conventional automobile chassis frame or with my improved chassis frame structure and with my improved swing axle assembly such as is illustrated in my copending application Serial No. 689,328 filed September 13, 1933.

An important characteristic is that my improved mounting and suspension is of an integral compact unitary character which occupies a small amount of space and provides maximum road clearance.

A further object is to provide a swingable half axle mounting and suspension in combination with a novel type of frame cooperating therewith. An important characteristic in one preferred embodiment is that the frame has a back bone section to the end of which the drive gear housing is secured and which is raised above the floor of the vehicle. This frame is forked at approximately the front seat line and depressed throughout this forked portion as it extends forwardly and terminates in upwardly extending spaced apart forks adjacent to the front axle.

A feature is the employment of resilient torsion members coupled with the swinging axle assemblies to yieldingly resist their swinging movement, which torsion members are so diagonally arranged between the swinging axles and the chassis frame members as to form a simple compact spring suspension which likewise stiffens and reinforces the chassis frame.

Figure 3:
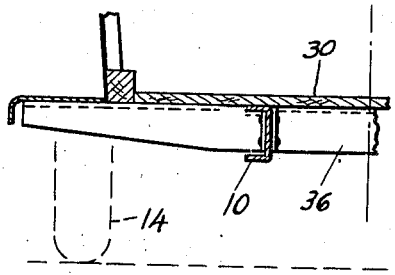
Figure 4:
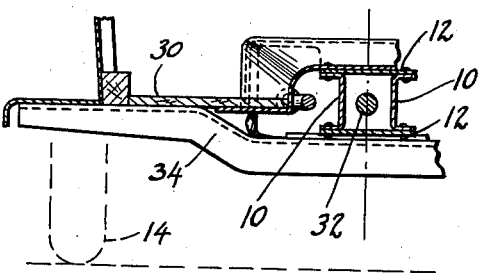
Figure 6:
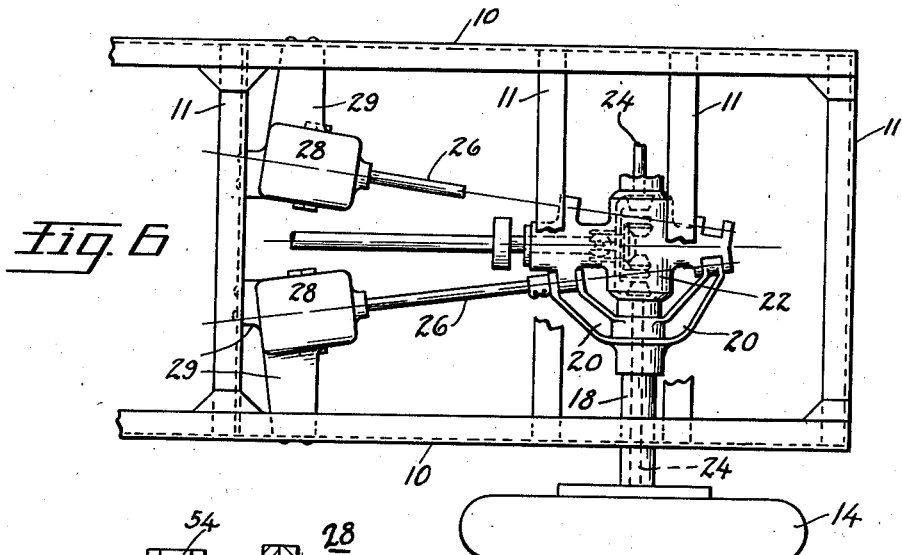
Figure 5:
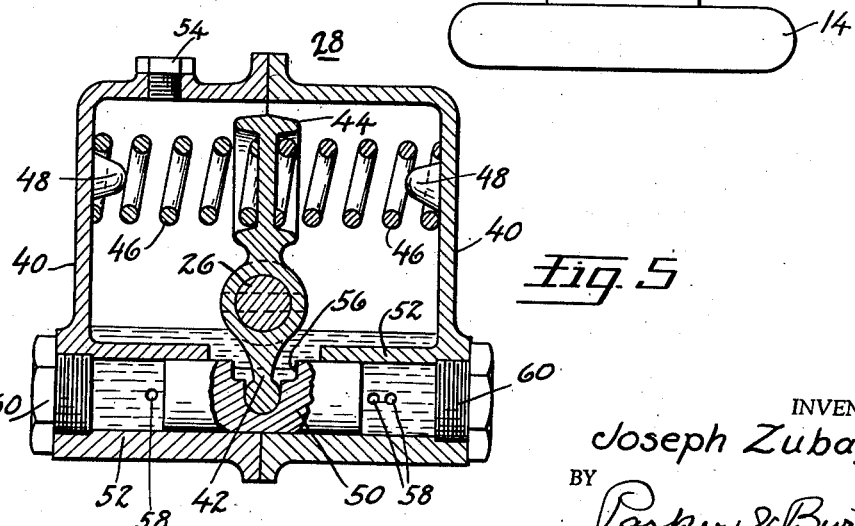

Other objects, advantages and meritorious features of my invention will more fully appear from the following description, appended claims, and accompanying drawings, wherein:

Figure 1 is a plan of a longitudinal portion of an automobile chassis frame embodying a preferred form of my invention, Fig. 2 is a sectional elevation taken on the line 2—2 of Fig. 1, Fig. 3 is a sectional view taken on line 3—3 of Fig. 2, Fig. 4 is a sectional view taken on line 4—4 of Fig. 2, Fig. 5 is a cross sectional view through one of the spring suspension units, and Fig. 6 is a plan of the rear end of a conventional chassis frame equipped with my improved suspension mechanism.

In the drawings I have illustrated my invention in association with an improved novel type of chassis frame such as illustrated in Figs. 1, 2, 3, and 4 and also in association with the conventional type of chassis frame such as illustrated in Fig. 6. In the preferred embodiment shown in the first four figures of the drawings I have illustrated a frame construction wherein the side frame members 10 are brought together throughout a portion of their length at the rear end of the vehicle forming a back bone section. Suitable plates 12 are arranged above and below these portions of the frame to secure them adjacent each other to form this back bone portion. The frame members 10 are forked and depressed at what would be approximately the front seat as they extend forwardly from this back bone portion as illustrated in Figs. 1 and 2. At a point just forward of the attachment of the front spring they extend upwardly to just above the front axle.

In the figures the road wheels 14 are mounted upon suitable axles. The front axle may be secured by springs 16 to the frame as indicated. The rear wheels are provided with independently swingable half axle assemblies each indicated as a unit at 18. Each of these half axle assemblies includes an axle tube which has a forked end 20 that embraces the gear casing 22 within which the drive gearing is located. The live axle 24 is coupled through a universal joint with the drive gearing to be driven thereby and this universal joint is located in the axis of swing of the axle tube 18.

This particular swing axle assembly is described in my copending application supra. The forked end of the axle tube 18 partially embraces the gear housing and is supported by a pair of spaced apart trunnions arranged externally thereof and on opposite sides of the housing as illustrated in the figures of the drawings. There is provided a torsion shaft 26 which is secured to the forward fork 20 of the axle tube as a prolongation of the axis of swing of the tube. This shaft 26 is shown in Figs. 1 and 2 as extending forwardly diagonally with respect to the centerline of the vehicle and at its forward end it is engaged by a suitable damping unit 28. This type of unit shown is what is commonly known as a Dubonnet suspension device though other suitably functioning torsionally yielding suspension devices might be employed.

The particular one here shown is secured to the side frame member 10 at the point where it begins to fork so that the two torsion shafts 26 spread apart as they extend forwardly. Though in Figs. 1 and 2 only one of such shafts is shown as only one half of the vehicle is illustrated, it is obvious that the omitted half is complementary. This Dubonnet suspension unit is adapted to yieldingly resist twisting of the shaft which occurs with the rise and fall of the road wheel 14 as the axle tube swings about its pivotal support. It is this resistance which forms the suspension for the load carried by this road wheel.

The construction may preferably be such that the resistance increases as the amplitude of swing increases and the shaft itself may be of such a character that it torsionally yields after the resistance of the damping unit reaches a predetermined point. For example, as the yielding elements of the damping unit reach their limits the shaft itself commences to yield if the torsional force is sufficient and against increasing resistance continues to yield to absorb the shock. This provides a particularly efficient combination of the two types of yielding resistance.

It is apparent that the construction is exceedingly simple and compact and occupies a minimum amount of space and facilitates the mounting and assembly of independently supported swinging axle assemblies.

In this preferred embodiment the back bone section of the frame rises above the floor level. The car is lowered as much as possible and the floor is placed on the lower flange of these frame sections as illustrated at 30 in Fig. 4. In this construction it will be seen that these frame sections are of U-shape and are bolted to the plates 12 which are arranged above and below them forming a peculiarly rigid box like type of back bone. Numeral 32 indicates the drive shaft extending therethrough into the gear housing 22. Numeral 34 is a cross frame member. The floor as it extends forwardly rests upon the upper flange of the depressed portions of the chassis frame members 10 as shown in Fig. 3 where 36 indicates a transverse frame member.

In Fig. 6 I have illustrated the improved suspension and mounting for my swinging axle assembly in conjunction with a conventional type of frame where the side frame members 10 are parallel and held in spaced relationship by transverse frame sections 11. The drive gear housing is suitably supported by two of these frame sections 11 and the swinging axle assemblies are trunnioned thereon in a manner similar to that described in conjunction with the description of the structure shown in Figs. 1 and 2. The torsion shafts 26 extend forwardly as an integral prolongation of the axis of swing of the front fork of the axle tubes 18 and at their forward ends are engaged with the damping units 28. These damping units are suitably supported by brackets 29 from the frame. The damping unit may be of the type illustrated in the first two figures of the drawings. A cross section of a suitable unit is shown in Fig. 5.

In this figure of the drawings the unit is shown as comprising a casing which may be formed in halves 40 suitably secured together. The shaft 26 extends into the casing and is there provided with a pair of oppositely directed arm 42 and 44. The arm 44 is formed so that springs 46 are arranged on opposite sides thereof. Each spring 46 bears at one end against a recessed portion of the arm as shown and seats at the opposite end about a projection 48 in the side wall of the casing so as to resist swinging movement of the arm as the shaft 26 twists.

The arm 42 is relatively shorter and it engages a piston 50. This piston is mounted in a cylinder 52 located in the floor of the casing. The cylinder may be supplied with oil or other fluid. The casing has a filler plug 54 through which this liquid may be admitted and the cylinder has an opening 56 through which it may be filled with liquid. The walls of the cylinder may be perforated as at 58 with a plurality of perforations through which liquid may escape as the piston reciprocates within the cylinder. As the piston does reciprocate these apertures 58 are shut off by the piston so that resistance to such reciprocation increases with the extent of the reciprocation. The operation is apparent. The ends of the cylinder may be closed by plugs 60 as shown.

The damping unit described will, it is evident, increasingly resist twisting of the shaft 26 and as above described when the yielding elements therein approach their limit the shaft 26 itself may again yeld with increasing resistance to its twisting.

In the construction shown in Fig. 6 the diagonally extending torsion shafts 26 stiffen and reinforce the frame itself and in addition to serving as the spring suspension for the swingable half axle assemblies perform this important function.

What I claim is:

1. A motor vehicle having drive gearing, a housing forming a sealed enclosure for the gearing, a pair of half axle assemblies each including a half axle member pivotally articulated with the gearing within the housing and an axle tube having a forked end partially encompassing the housing and pivotally supported externally thereof for swinging movement, a torsion member secured to each axle tube extending lengthwise of the vehicle in prolongation of the pivotal axis of the tube to rotate upon swinging movement thereof, and means engaging each torsion member at a point spaced from the half axle assembly to yieldingly resist rotation of the torsion member.

2. A motor vehicle having drive gearing, a housing for the gearing, a pair of half axle assemblies each including a half axle member coupled through a universal joint with the gearing within the housing and an axle tube having a forked inner end encompassing the housing and pivotally supported for swinging movement about an axis extending through said universal joint and disposed diagonally with respect to the vehicle centerline, a torsion member secured to the forked end of each axle tube as an axial extension of the pivotal support thereof to rotate upon swinging movement of the tube, and means engaging each torsion member at a substantial distance from the axle assembly to yieldingly resist the swinging of the axle assembly.

3. A motor vehicle having a chassis frame and a pair of road wheels at each end, drive gearing enclosed within a housing secured to said chassis frame, a pair of half axle assemblies each including a half axle pivotally coupled with the gearing within the housing and an axle tube having a forked end partially encompassing the housing and pivotally supported thereby for swinging movement upon an axis extending diagonally with respect to the vehicle centerline and through the pivotal connection of the axle with the gearing, a torsion member secured at one end to the fork of each axle tube and extending diagonally of the frame and rotatable upon swinging movement of the axle tube, and means secured to said chassis frame engaging each torsion member to yieldingly resist its rotation.

4. A motor vehicle having a pair of frame members, a pair of road wheels each carried upon a swinging half axle assembly supported upon the frame members, a torsion shaft connected with each half axle assembly to rotate upon swinging movement thereof and extending diagonally to the adjacent frame member and connected therewith by suspension means adapted to yieldingly resist rotation of the shaft.

5. A motor vehicle having a pair of side frame members, means spacing the same apart, a pair of road wheels each carried upon a swinging half axle assembly pivotally mounted in proximity to the centerline of the vehicle, a torsion shaft extending from the pivoted end of each half axle assembly diagonally of the vehicle to the adjacent side frame member, said shaft being rotatable upon swinging movement of the axle assembly, and means engaging each shaft to yieldingly resist its rotation.

6. A motor vehicle having a pair of frame members arranged in substantial juxtaposition at one end of the vehicle and spread apart at the opposite end of the vehicle and depressed intermediate their ends and throughout a portion of their spread apart length, a pair of road wheels each carried on a half axle assembly pivotally mounted adjacent the juxtaposed ends of the frame members for swinging movement about a diagonal axis, a torsion shaft connected with each half axle at its pivoted end to rotate upon swinging movement thereof and extending as a projection of the diagonal axis of the half axle to the adjacent frame member and connected therewith at a point where said frame members are spread apart through mechanism operable to yieldingly resist rotation of the shaft.

7. A motor vehicle having a chassis frame and a pair of half axle assemblies each carrying a road wheel and pivotally supported at its inner end upon the frame for swinging movement, each half axle assembly provided with a torsion member rotatable upon swinging movement of the assembly, and suspension mechanism on said chassis frame engaging each torsion member to resist its rotation yieldingly for a determined distance of rotation beyond which distance said mechanism ceases to yield, each torsion member being itself resistingly yieldable to a twisting movement beyond said distance.

8. A motor vehicle having a chassis frame and a pair of half axle assemblies each supported thereby at its inner end for swinging movement, a torsion member secured to each half axle assembly in prolongation of the pivotal axis of swing of the assembly to rotate upon swinging movement of the assembly, chassis suspension mechanism on said chassis frame engaging each torsion member to resist its rotation and being resistingly yieldable thereto throughout a determined arc of rotation beyond which it ceases to yield, each torsion member being itself resistingly yieldable to twisting movement imposed thereon by the half axle following the yielding of the chassis suspension mechanism.

9. A motor vehicle having a chassis frame and a pair of road wheels each carried upon a swinging half axle assembly pivotally mounted adjacent its inner end upon the frame for swinging movement, a shaft connected with each half axle at its pivoted end to rotate upon swinging movement of the axle, said shaft extending diagonally outward of the centerline of the vehicle, and means connecting the outer end of the shaft to said chassis frame and adapted to yieldingly resist rotation of the shaft.

10. In a motor vehicle, a pair of frame members having sections thereof arranged in parallel substantial juxtaposed relation at one part of the vehicle and in angular relation to one another extending outwardly diagonally of the vehicle at another part thereof, a pair of road wheels each carried on a half axle assembly pivotally mounted for swinging movement adjacent to but on opposite sides of the juxtaposed sections of the frame members and about axes projecting diagonally of the vehicle, a torsion shaft connected with each half axle assembly at its pivoted end to rotate upon swinging movement thereof, said shaft extending as a projection of the pivotal axis of the half axle assembly diagonally of the vehicle toward the diagonally extending section of the adjacent frame member, and means coupling said shaft to the diagonal section of the adjacent frame member yieldingly resisting rotation of the torsion shaft.

11. A motor vehicle having a chassis frame and a pair of half axle assemblies each carrying a road wheel and pivotally supported at its inner end upon the frame for swinging movement, each half axle assembly provided with a torsion member having one end connected therewith and extending longitudinally of the chassis frame and rotatable upon swinging movement of the assembly, and suspension mechanism secured to said chassis frame and engaging the opposite end of each torsion member to increasingly yieldingly resist its rotation and being increasingly resistingly yieldable throughout a determined arc of rotation, each torsion member being itself increasingly resistingly yieldable to twisting movement but only following initial yielding of the suspension mechanism.

JOSEPH ZUBATY.